United States Patent [19]

Raynor

[11] Patent Number: 5,093,431
[45] Date of Patent: Mar. 3, 1992

[54] CHLORINATION OF AMIDE CONTAINING OLIGOMERS AND POLYMERS

[75] Inventor: Robert J. Raynor, North Branford, Conn.

[73] Assignee: Olin Corporation, Cheshire, Conn.

[21] Appl. No.: 498,666

[22] Filed: Mar. 26, 1990

[51] Int. Cl.$^5$ .................. C08G 69/48; C08F 20/54; C08F 283/04; C08L 77/00
[52] U.S. Cl. .................. 525/329.4; 525/420; 525/421; 525/422; 525/434
[58] Field of Search .................. 525/329.4, 420, 422, 525/434

[56] References Cited

U.S. PATENT DOCUMENTS

| | | | |
|---|---|---|---|
| 4,603,178 | 7/1986 | Phan et al. | 525/420 |
| 4,676,995 | 6/1987 | Fabris et al. | 525/329.4 |
| 4,720,518 | 1/1988 | Chihara et al. | 525/440 |
| 4,789,703 | 12/1988 | Fabrus et al. | 524/464 |

FOREIGN PATENT DOCUMENTS 2338755 2/1975 Fed. Rep. of Germany ... 525/329.4

OTHER PUBLICATIONS

Kirk-Othmer, Encyclopedia of Chemical Technology, vol. 5, Third Edition, 1979, pp. 580–581.
"Synthesis of N-Halogeno-N-Sodioalkanesulphonamides", Hardy, J. Chem. Soc., 1970, pp. 2087–2089.
"Properties of N-Chloro-polyamides", Kaczmar, Angew. Chem. Internatinoal Edition, vol. 12 (1973), No. 5, pp. 430–431.
"N-Chloro Nylons as Polymer Reagents" Schuttenberg, et al., J. Macromol. Sci-Chem., A7 (5) pp. 1085–1095 (1973).
"Chlorine Exchange Resins" Wayman, et al., The Canadian Journal of Chemical Engineering, vol. 46, Aug., 1968, pp. 282–287.
"Functionally Modified Poly(styrene–divinylbenzene) Preparation, Characterization, & Bacterial Action" Emerson, et al., (1978) pp. 269–274, Ind. Eng. Chem. Prod. Res. Dev. vol. 17.

*Primary Examiner*—John Kight, III
*Assistant Examiner*—Rabon Sergent
*Attorney, Agent, or Firm*—Donald M. Papuga; F. A. Iskander

[57] ABSTRACT

Described herein is a process for the chlorination of amide containing oligomers and/or polymers by reacting the oligomers and/or polymers with an aqueous hypochlorous acid solution containing at least 5% by weight of hypochlorous acid and being essentially free of chlorine, chlorate, and alkali metal ions, said process being conducted in an aqueous medium.

20 Claims, No Drawings

CHLORINATION OF AMIDE CONTAINING OLIGOMERS AND POLYMERS

This invention is directed to the chlorination of amide containing oligomers and polymers by reacting the oligomers and/or polymers with an aqueous hypochlorous acid solution containing at least 5% by weight of hypochlorous acid and being essentially free of chlorine, chlorate, and alkali metal ions, said process being conducted in an aqueous medium.

Several chlorinated amide containing polymers are known in the art.

Hardy, in an article titled "Synthesis of N-Halogeno-N-Sodioalkanesulphonamides", J. Chem. Soc., 1970, pages 2087-2089, describes the reaction of aliphatic sulphonamides with aqueous sodium hypochlorite and sodium hypobromite to yield the N-halogeno-N-sodio-derivatives. The lower homologues (R=methyl or ethyl) are prepared by a route starting with the following reaction:

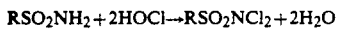

$$RSO_2NH_2 + 2HOCl \rightarrow RSO_2NCl_2 + 2H_2O$$

The hypochlorous acid (HOCl) used is stated to be generated by acidification of commercial sodium hypochlorite solution. The N-halogeno-N-sodioalkanesulphonamides so produced are stated to be useful for conversion into crystalline SS-dimethylsulphimides.

Kaczmar, in an article titled "Properties of N-Chloropolyamides", Angew. Chem. International Edition, Vol. 12 (1973), No. 5, pages 430-431, states that an aqueous solution of hypochlorous acid is very suitable for use as the N-chlorinating agent. Specifically, Nylon 6,6 is chlorinated. The article states that a number of chemical and physicochemical properties of certain N-chloropolyamides allow the preparation of a resin whose high oxidation potential can be used for oxidation reactions in the aqueous phase.

Schuttenberg, et al., in an article titled "N-Chloro Nylons as Polymer Reagents", J. Macromol. Sci-Chem., A7 (5) pages 1085-1095 (1973) describes the preparation of N-chlorinated nylons where more than 90% of the N-H bonds were converted to N-Cl bonds. This paper describes the chlorination of several linear polyamides (e.g., Nylon 66, Nylon 6, and Nylon 3). Aqueous hypochlorous acid is stated as an easy reagent to use for the chlorinations. On page 1094, the article describes the chlorination of Nylon 6,6 particles of 0–0.3 diameter with an 0.11 m HOCl solution for 40 hours The aqueous HOCl solution is stated as prepared from 10–12% sodium hypochlorite solution The N-chlorinated nylons are stated as useful to oxidize organic compounds such as alcohols.

Wayman, et al., in an article titled "Chlorine Exchange Resins", The Canadian Journal of Chemical Engineering, Vol. 46, August, 1968, pages 282-287, states that all resins with primary or secondary amide groups or aminoamines should undergo chlorination via reaction (1), i.e.:

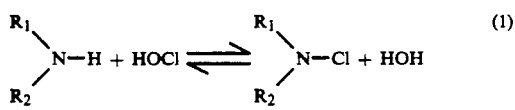

No details are given as to the reaction conditions using the HOCL. Among the resins stated as used in the experiments are amino resins (urea and melamine formaldehyde), polyacrylamides, proteins, and polyamides. Polyurethanes are stated as potentially useful resins. The chlorinated resins are stated as useful to liberate the chlorine, via hydrolysis, when exposed to an aqueous medium that is low in chlorine or has a chlorine demand.

Emerson, et al., in an article titled "Functionally Modified Poly(styrene-divinylbenzene) Preparation, Characterization, and Bacterial Action", Ind. Eng. Chem. Prod. Res. Dev. Vol. 17, No. 3 (1978), pages 269-274 has a general statement beginning on page 271 that sulfonamide resin was chlorinated in situ using sodium hypochlorite or hypochlorous acid. The chlorosulfonamide resin is stated as having bactericidal action.

U.S. Pat. No. 4,789,703, issued Dec. 6, 1988, describes that a solid pelletized and thermoplastic polymer or resin having amide –(CONH)– groups can be brominated or chlorinated in aqueous suspension in the presence of an organic solvent to form a solution in the solvent of a bromine or chlorine containing thermoplastic polymer. The (—CONH—) polymer is selected from polyacrylamides, polyamideimides, polysulfonamides, polyurethanes, polyurea, polyurethane-urea, and polyamides.

The patent states that various reagents and mixtures thereof can be used to chlorinate or brominate the thermoplastic polymers including sodium hypobromite, hypochlorous acid, salts of hypochlorous acid (aqueous calcium hypochlorite), or aqueous sodium hypochlorite, alkyl hypochlorites (t-butyl hypochlorite), elemental bromine or chlorine, dibromomonoxide, and dichloromonoxide.

Example 12 of the patent chlorinates nylon 11 pellets using hypochlorous acid and methylene chloride. Concentrated hydrochloric acid is added.

The chlorinated or brominated amide-containing polymers of U.S. Pat. No. 4,789,703 are used as coatings on a rubbery substrate.

In the present invention, it has been found that amide-containing oligomers and/or polymers can be effectively chlorinated using a highly pure aqueous solution of hypochlorous acid.

The chlorinated polymers and/or oligomers were found to be efficient bactericides and fungicides. These properties make these chlorinated polymers and/or oligomers useful for applications involving the treatment of water such as sanitizers for swimming pools, and the like, or for regulating the available chlorine content of such pools. The solubility of these chlorinated polymers in common, volatile solvents such as methylene chloride, chloroform, etc., allows them to be used for the formation of coatings for application where biostatic surfaces are desired. When the biostatic action of such surfaces has been exhausted, it may be regenerated by treatment with hypochlorous acid. The chlorinated polymer may also be allowed to loose its chlorine content which will leave a tough non-chlorinted coating on the substrate to which it is applied, such as a nylon coating. The ability of the chlorinated polymers to dissolve in solvents may also allow their use as adhesives. The loss of chlorine by air hydrolysis and the concurrent regeneration of, for example, polyamide polymer may form a strong adhesive bond to various substrates.

Specifically, this invention comprises a process for chlorinating an amide-containing oligomer and/or polymer by reacting the oligomer and/or polymer with an aqueous hypochlorous acid solution containing at least 5% by weight of hypochlorous acid and being essentially free of chlorine, chlorate, and alkali metal ions, said process being conducted in an aqueous medium.

The clorinated oligomers and polymers so produced can be effectively used as algicides, bactericides, and fungicides to kill and inhibit the growth of algae, bacteria, and fungus, particularly in purifying aqueous liquids. Also, the chlorinated oligomers and polymers may be dissolved in an organic solvent and coated on a desired surface to form a coating or film thereon thereby providing a biostatic surface. The chlorinated polymers may also be used as an adhesive.

The amide $-(CONH)-$ containing polymers are well-known in the art and include polyacrylamides, polyamides, polyurethanes, polyamideimides, polyureas, polysulfonamides, and mixtures thereof. These amide-containing polymers are well-known in the art and are described, for example, in the Encyclopedia of Science and Engineering, 2nd Edition, John Wiley & Sons, 1985, Volumes 1, 11, 13, and 14. The preferred amide-containing polymer is a polyamide such as Nylon 6,6; Nylon 6; Nylon 6, 12; Nylon 4; and the like. The low molecular weight or oligomer version of these polymers may also be used.

The amide-containing polymers and oligomers are preferably chlorinated in pelletized or fine particle form.

The hypochlorous acid used in the instant process may be characterized as a solution containing greater than 5%, preferably from about 20% to about 65%, and most preferably from about 35% to about 55% by weight of hypochlorous acid. The hypochlorous acid solution is substantially free of chloride, chlorate, and alkali metal ions.

The concentrated hypochlorous acid solution may be produced from a gaseous mixture comprised of chlorine monoxide, hypochlorous acid vapor, chlorine, and water vapor, which process comprises condensing the gaseous mixture at a temperature in the range of from about $-5°$ C. to about $+10°$ C.

In more detail, the process for producing the concentrated hypochlorous acid solution comprises reacting an aqueous alkali metal hydroxide, such as sodium hydroxide, potassium hydroxide, or lithium hydroxide in droplet form with chlorine gas. The reaction is conducted at temperatures sufficiently high enough to vaporize hypochlorous acid as it is produced and separate it from solid particles of alkali metal chloride which are also formed in the reaction. As gaseous mixtures having high concentrations of hypochlorous acid and chlorine monoxide are desired, highly concentrated aqueous solutions of the alkali metal hydroxide are used. Suitable concentrations include those in the range of from about 40% to about 80%, and preferably from about 45% to about 60% by weight of alkali metal hydroxide. A stoichiometric excess of chlorine above that required to form hypochlorous acid with all of the alkali metal hydroxide is used, for example from about 1 to about 20, and preferably from about 5 to about 10 times the stoichiometric proportion of chlorine is employed. Solid particles of alkali metal chloride are also produced during the reaction which have a wide range of particles sizes.

The gaseous mixture comprised of hypochlorous acid vapor, chlorine monoxide, chlorine, and water vapor used in the process contains high concentrations of HOCl and $Cl_2O$. The chlorine monoxide is formed by the conversion of HOCl vapors during the vaporization process according to the equation:

$$2HOCl \rightleftharpoons Cl_2O + H_2O \quad (1)$$

The gaseous mixture also contains fine particles of the alkali metal chloride which are entrained. The solid particles may be removed by any suitable separation means, for example, by passing the gaseous mixture through a gas filter medium or through a solid separator such as a cyclone.

The gaseous mixture, now free of solids, is fed to a condenser. The condenser is operated at temperatures which produce concentrated aqueous solutions of hypochlorous acid without condensing undesirable amounts of chlorine or liquid chlorine monoxide Suitable temperatures for operating the condensation process include those in the range of from about $-5°$ C. to about $+20°$ C.

The uncondensed gaseous mixture recovered from the condenser is substantially anhydrous as the water vapor originally present was condensed to form the aqueous hypochlorous acid solution. While the hypochlorous acid concentration is significantly reduced, the chlorine gas concentration is substantially the same as that in the original gaseous mixture fed to the condenser.

The concentrated hypochlorous acid solution is highly pure. The dissolved chlorine concentration in the hypochlorous acid solution of the present invention is less than about 2% by weight. The concentrated hypochlorous acid solution is essentially free of ionic impurities such as alkali metal, chloride, and chlorate ions. Concentrations of the chloride ion are less than about 50 parts Per million; the alkali metal ion concentration is less than about 50 parts per million; and the chlorate ion concentration is no more than about 100 parts per million.

A process for producing hypochlorous acid is described in, for example, U.S. Pat. No. 4,146,578, incorporated in its entirety herein by reference.

The chlorination process of this invention may be carried out over a wide range of reaction conditions, depending upon the amide-containing polymer or oligomer to be chlorinated. Typical temperature ranges include those from about $-20°$ C. to about $100°$ C., preferably from about $0°$ C. to about $50°$ C., and most preferably from about $0°$ C. to about $25°$ C.

The chlorination of the amide-containing polymer or oligomer is carried out in an aqueous medium. The reaction may be carried out for a period of about one minute up to a reaction time of about eight hours.

The molar ratio of the hypochlorous acid to starting amide-containing polymer or oligomer is generally from about 0.5 to 1 to about 10 to 1.

EXAMPLES

The following example illustrates the process of this invention and is presented without the intention of being limited thereby.

Preparation of Hypochlorous Acid Solution

The following represents a typical process for the preparation of a concentrated aqueous hypochlorous acid solution useful in the process of this invention:

A gaseous mixture containing an average concentration of 180.7 parts by weight of chlorine monoxide, 384.5 parts by weight of $Cl_2$, and 60.3 parts by weight of water vapor was continuously passed through a cyclone separator to remove any entrained solid particles of alkali metal chloride. The solid-free gaseous mixture at a temperature of 85°–90° C. was passed through a vertical shell and tube heat exchanger maintained at a temperature of about 0° C. and a pressure of about 3–4 torr gauge to condense a portion of the chlorine monoxide and substantially all of the water vapor to produce an aqueous hypochlorous acid solution containing 45 to 50% by weight of HOCl. The hypochlorous acid solution had a pH of about 1 and the dissolved chlorine concentration was determined to be about 1% by weight. An uncondensed gas mixture containing an average of 141.9 parts by weight of $Cl_2O$, 384.1 parts by weight of $Cl_2$ and 0.5 parts by weight of water was continuously removed from the condenser. The uncondensed gas mixture was passed through a heat exchanger to raise the temperature to about 100° C. and recycled to a generator used to produce the gaseous mixture of chlorine monoxide.

Preparation of N-Chloro Poly(hexamethylene adipamide)

A 7.5 g. sample of finely powdered Nylon 6,6 was suspended in 200 ml of 1.00 molar hypochlorous acid, and this slurry was stirred at 25° C. for 24 hours. The solids were removed by filtration, washed three times with water and dried. The solids were then dissolved in toluene and the toluene solution slowly Poured into stirred ether at 25° C. The white solids which were precipitated from the ether were removed by filtration, washed with ether, and dried to give 5.83 g. of a fine white powder which was found by analysis to contain 47.2% available chlorine. Nuclear magnet resonance spectroscopy confirmed that the chlorine was attached to the nitrogen atoms of the polyamide.

Antimicrobial Activity of Chlorinated Nylon 6.6

Chlorination of Nylon 6,6 with the hypochlorous acid solution resulted in the formation of an N-chloramide which possesses antibacterial and antifungal activity. The slow rate of kill and production of chlorine in solution is indicative of a slow release form of available chlorine.

Glass microscope cover slips were coated with a methylene chloride solution of the chlorinated Nylon 6,6 prepared above. The methylene chloride was allowed to evaporate leaving a film of polymer on the glass surface.

These samples of coated glass were tested for antifungal and antibacterial activity as follows:

Antifungal Activity. The procedure described in ASTM G21-80, "Resistance of synthetic Polymeric Materials to Fungi", was followed. Samples of film cast on 17 mm diameter glass cover slips were place on nutrient salts agar and sprayed with a mixture of five types of fungal spores. After three weeks of storage in a humid environment, uncoated blanks were covered with growth, whereas the N-chloro Nylon 6,6 was growth-free.

Antibacterial Activity. *Staphylococcus aureus*, ATCC 6538, and *Escherichia coli*, ATCC 11229, grown in a nutrient broth and washed free of soluble organic material, were suspended in 5 ml of 0.01M potassium phosphate (pH 7.4) to a density of approximately $10^4$/ml. One cover coated with N-Chloro Nylon 6,6 was dropped into each suspension, and numbers of survivors were monitored for 22 hours by plate-counting. In 5.5 hours, numbers of survivors of both types were reduced more than 99% relative to controls (see Table 1), and 0.5 to 0.6 ppm of total active chlorine was detected in 22 hours.

TABLE 1

| Time (Hours) | Control S. Avreus | Control E. Coli | Treated S. Avreus | Treated E. Coli |
| --- | --- | --- | --- | --- |
| 0 | 175 | 160 | 350 | 200 |
| 2.5 | 200 | 200 | 50 | 130 |
| 5.0 | 160 | 200 | 0 | 0 |
| 10.0 | 160 | 200 | 0 | 0 |
| 15.0 | 160 | 200 | 0 | 0 |
| 20.0 | 160 | 200 | 0 | 0 |
| 25.0 | 150 | 200 | 0 | 0 |

What is claimed is:

1. A process for chlorinating an amide -(-CONH-)- containing oligomer and/or Polymer which comprises reacting the oligomer and/or polymer with an aqueous hypochlorous acid solution containing about 20 to about 65% by weight of hypochlorous acid and being essentially free of chlorine, chlorate, and alkali metal ions, said process being conducted in an aqueous medium.

2. A process as defined in claim 1, wherein the oligomer and/or polymer is a polyacrylamide.

3. A process as defined in claim 1, wherein the oligomer and/or polymer is a polyurethane.

4. A process as defined in claim 1, wherein the oligomer and/or polymer is a polyamideimide.

5. A process as defined in claim 1, wherein the oligomer and/or polymer is a polyurea.

6. A process as defined in claim 1, wherein the oligomer and/or polymer is a polysulfonamide.

7. A process as defined in claim 1, wherein the oligomer and/or polymer is a polyamide.

8. A process as defined in claim 7, wherein the polyamide is a nylon.

9. A process as defined in claim 8, wherein the nylon is selected from the group consisting of Nylon 6,6, Nylon 6, Nylon 6, 12, Nylon 4, and combinations thereof.

10. A process as defined in claim 1, wherein the hypochlorous acid solution contains from about 35 to about 55% by weight of hypochlorous acid.

11. A process as defined in claim 1 which is conducted at a temperature of from about −20° C. to about 100° C.

12. A process as defined in claim 1 which is conducted at a temperature of from about 0° C. to about 50° C.

13. A process as defined in claim 1, wherein the molar ratio of hypochlorous acid to the oligomer and/or polymer is from 0.5 to 1 to about 10 to 1.

14. A process for chlorinating a polyamide which comprises reacting the polyamide with an aqueous hypochlorous acid solution containing about 20 to about 65% by weight of hypochlorous acid and being essentially free of chlorine, chlorate, and alkali metal ions, said process being conducted in an aqueous medium.

15. A process as defined in claim 14, wherein the polyamide is selected from the group consisting of Nylon 6,6, Nylon 6, Nylon 6, 12, Nylon 4, and combinations thereof.

16. A process as defined in claim 15 which is conducted at a temperature of from about 0° C. to about 50° C.

17. A process for chlorinating an amide (-CONH-) containing oligomer and/or polymer which comprises the following steps:

(I) forming a hypochlorous acid solution from a gaseous mixture comprised of chlorine monoxide, hypochlorous acid vapor, chlorine, and water vapor comprising condensing the gaseous mixture at a temperature in the range of from about −5° C. to about +10° C., and (II) contacting said hypochlorous acid solution with an amide (CONH) containing oligomer and/or polymer.

18. A process as defined in claim 17, wherein the hypochlorous acid solution contains from about 20 to about 65% by weight of hypochlorous acid.

19. A process as defined in claim 17, wherein the hypochorous acid solution contains from about 35 to about 55% by weight of hypochlorous acid.

20. A process as defined in claim 17, wherein step (II) is carried out at a temperature of from about −20° C. to about 100° C.

* * * * *